United States Patent [19]
Miller

[11] Patent Number: 5,134,766
[45] Date of Patent: * Aug. 4, 1992

[54] AUTOMATIC WEIGHT APPLICATION MACHINE

[75] Inventor: William H. Miller, McCordsville, Ind.

[73] Assignee: Ransburg Corporation, Indianapolis, Ind.

[*] Notice: The portion of the term of this patent subsequent to Sep. 17, 2008 has been disclaimed.

[21] Appl. No.: 681,885

[22] Filed: Apr. 8, 1991

Related U.S. Application Data

[63] Continuation of Ser. No. 435,483, Apr. 24, 1989, Pat. No. 5,048,173, which is a continuation of Ser. No. 39,586, Apr. 16, 1987, abandoned.

[51] Int. Cl.$^5$ .................. B23P 11/02; B23P 21/00
[52] U.S. Cl. ........................... 29/450; 29/235; 29/243.56; 29/283; 29/283.5; 29/453; 29/525; 29/789
[58] Field of Search ............ 29/450, 525, 787, 789, 29/407, 453, 235, 818, 810, 243.56, 283, 283.5; 73/468, 467; 301/5 B, 5 BA

[56] References Cited

U.S. PATENT DOCUMENTS

| | | |
|---|---|---|
| Re. 28,601 | 11/1975 | Hofmann . |
| 2,122,065 | 6/1938 | Hume . |
| 2,620,731 | 12/1952 | Slonneger . |
| 2,657,454 | 11/1953 | Huyett . |
| 2,769,642 | 11/1956 | Berry . |
| 2,865,090 | 12/1958 | Cohn . |
| 3,030,700 | 4/1962 | Jensen . |
| 3,149,413 | 9/1964 | Baskell . |
| 3,526,943 | 9/1970 | Erhardt, Jr. . |
| 3,623,208 | 11/1971 | Hofmann . |
| 3,633,263 | 1/1972 | Hoeksema . |
| 3,748,910 | 7/1973 | Hofmann . |
| 3,762,733 | 10/1973 | Lana . |
| 3,868,118 | 2/1975 | Hirvi . |
| 3,995,360 | 12/1976 | Millheiser . |
| 4,277,872 | 7/1981 | Lewis . |
| 4,501,054 | 2/1985 | Morgan . |
| 4,554,734 | 11/1985 | Sander . |

FOREIGN PATENT DOCUMENTS

| | | |
|---|---|---|
| H14323 II | 10/1955 | Fed. Rep. of Germany . |
| 941956 | 4/1956 | Fed. Rep. of Germany . |
| 914753 | 1/1963 | United Kingdom . |

Primary Examiner—Joseph M. Gorski
Attorney, Agent, or Firm—Barnes & Thornburg

[57] ABSTRACT

A machine for automatically applying a balance correcting weight (44)-and-clip (46) assembly to vehicle wheel-and-tire assembly (12). The machine includes a conveyor (20) portion for conveying the wheel-and-tire assembly (12) to a weight (44) application station, orienting the wheel-and-tire assembly (12) properly to receive at the correct location the balance-correcting weight (44), and conveying the wheel-and-tire assembly (12) to which the balance-correcting weight (44) has been applied away from the weight (44) application station. The machine includes a hammer (22, 24) having a storage orientation out of operating position permitting conveying of the wheel-and-tire assembly (12) to and from the weight (44) application station and a use orientation in operating position adjacent the wheel-and-tire assembly (12) to which balance correcting weight (44) is to be applied, and means for moving the hammer (22, 24) selectively between its storage and use orientations. The hammer (22, 24) includes a jaw (40) with a contour conforming to the shape of the clip (46) and a shank (50) portion of ferromagnetic material, said shank (50) being surrounded by an electrically conductive coil (94).

8 Claims, 2 Drawing Sheets

AUTOMATIC WEIGHT APPLICATION MACHINE

This is a continuation of U.S. Pat. Application Ser. No. 07/435,483 filed Apr. 24, 1989, and now U.S. Pat. No. 5,048,173 which is a continuation of PCT/U.S. 88/00936 filed Mar. 24, 1988 which is a continuation of U.S. Ser. No. 07/039,586 filed 16 Apr. 1987 (now abandoned).

This invention relates to automatic weight application machines for applying correcting weights to rotary elements once the amounts and locations of weight required to correct imbalance existing in such rotary elements are determined. The invention is disclosed in the context of a machine for automatically applying balance correcting weights to vehicle wheel-and-tire assemblies. However it is believed that the invention is useful in other applications in which balance correcting weights are to be applied to other types of rotary elements as well.

American style single component balance correcting weights include selected different mass value portions, typically of lead, with a molded-in-place, spring steel clip to retain the lead mass on the wheel rim flange. Customarily, these balance-correcting weights have been manually selected, positioned on the flange at the point where correction is to be applied, and installed by driving the clip portion onto the flange with a hammer.

Techniques and apparatus for applying balance correcting weights to vehicle wheel-and-tire assemblies are known. For example, U.S. Pat. No. 3,623,208 describes a machine which utilizes the European-style two-part weight-and-clip correction scheme. In this machine, the tire is temporarily pressed away from the wheel flange. The retaining clip is slipped into place over a dummy weight form. The tire is then released. The dummy weight form is removed and the clip is held in place, sandwiched between the wheel flange and the tire. The proper correction weight is then inserted under the clip to complete the balance correction process. The mechanism of U.S. Pat. No. 3,623,208 only achieves the installation of the retaining clip. The actual correcting weight is manually inserted later.

In U.S. Pat. No. 4,554,734 a means for handling the European-style weights is described along with a simplified installation technique in which the temporary use of the dummy weight form is not necessary. The actual balance-correcting weight is placed on the wheel and the retaining clip is then pushed onto the wheel rim flange by another mechanism, avoiding the need to press the tire away from the wheel flange. The mechanism of U.S. Pat. No. 4,554,734 achieves the complete installation of the European two-piece correction weights, but would not accommodate the American-style weights due to their changing and irregular shapes.

In German Patent Specification 941,956, a mechanism is described to install an American-style one piece correction weight with a molded-in retaining clip. This mechanism retains the weight in a pressure pad with a spring and pushes the assembly onto the wheel flange using a C-clamp arrangement manually actuated through a mechanical linkage. The mechanism of German Patent Specification 941,956 employs a form-fitting pressure pad and spring retainer to install the American-style one-piece weight-and-clip-assembly manually, but makes no provision for handling the weight and would be difficult to automate.

It is an object of the present invention to provide an apparatus which is readily adaptable to a system for automatically applying American-style, single component, balance-correcting weights to vehicle wheel-and-tire assemblies.

The present invention eliminates the need to depress the sidewall of the tire away from the wheel rim, provides a mechanism by which irregularly-shaped, American-style weights can be manipulated by their common features, and transported to an application station in the proper orientation for application, and provides a mechanism by which the weights can be installed automatically.

According to the present invention, preparation for the application of a balance-correcting weight-and-clip assembly to a vehicle wheel-and-tire assembly comprises conveying the wheel-and-tire assembly into a known position in the application machine, orienting the location on the wheel-and-tire assembly to which balance-correcting weight is to be applied in a known position, and bringing the balance-correcting weight-and-clip assembly into a closely spaced relation adjacent to the location on the wheel-and-tire assembly to which the correcting weight is to be applied.

According to one aspect of the invention, a method for automatically applying a balance correcting weight including a ferromagnetic portion to a rotary element comprises orienting the weight for application by placing a magnet on the weight in close proximity to the ferromagnetic portion, conveying the magnet into close proximity to the rotary element, relatively orienting the rotary element and magnet so that the weight carried by the magnet is properly oriented to be applied to the rotary element to correct imbalance existing in the rotary element, and moving the magnet to apply the weight to the rotary element.

Additionally, according to this aspect of the invention, the rotary element comprises a vehicle wheel-and-tire assembly, the weight comprises a weight-and-clip assembly including a clip for mounting the weight on a flange of the vehicle wheel-and-tire assembly, and the step of moving the magnet to apply the weight to the rotary element comprises the step of exerting force on the magnet to move it relative to the flange of the vehicle wheel-and-tire assembly to which the weight is to be applied to hammer the clip onto the flange.

Further according to this aspect of the invention, the step of relatively orienting the rotary element and magnet so that the weight carried by the magnet is properly oriented to be applied to the rotary element to correct imbalance existing in the rotary element comprises the steps of relatively conveying the rotary element and magnet with the location on the rotary element to which balance correcting weight is to be applied in known orientation, and bringing the magnet into closely spaced relation adjacent to the location on the rotary element to which balance correcting weight is to be applied.

According to this aspect of the invention, the step of orienting the weight for application by Placing a magnet on the weight in close proximity to the ferromagnetic portion comprises the steps of providing an electromagnet including an electromagnetic coil and a ferromagnetic portion, orienting the electromagnet with the ferromagnetic portion of the electromagnet adjacent the weight to be applied, and Passing an electrical current through the electromagnetic coil to attract the ferromagnetic portion of the weight into close proximity to the ferromagnetic portion of the electromagnet.

Additionally, according to this aspect of the invention, the method further comprises the step of interrupting the current through the electromagnetic coil.

According to another aspect of the invention, apparatus for automatically applying a balance correcting weight including a ferromagnetic portion to a rotary element comprises means for orienting the weight for application by placing a magnet on the weight in close proximity to the ferromagnetic portion, means for conveying the magnet into close proximity to the rotary element, means for relatively orienting the rotary element and magnet so that the weight carried by the magnet is properly oriented to be applied to the rotary element to correct imbalance existing in the rotary element, and means for moving the magnet to apply the weight to the rotary element.

Additionally, according to this aspect of the invention, the rotary element comprises a vehicle wheel-and-tire assembly, the weight comprises a weight-and-clip assembly including a clip for mounting the weight on a flange of the vehicle wheel-and-tire assembly, and the means for moving the magnet to apply the weight to the rotary element comprises means for exerting force on the magnet to move it relative to the flange of the vehicle wheel-and-tire assembly to which the weight is to be applied to hammer the clip onto the flange.

Further according to this aspect of the invention, the means for relatively orienting the rotary element and magnet so that the weight carried by the magnet is properly oriented to be applied to the rotary element to correct imbalance existing in the rotary element comprises means for rotating the location on the rotary element to which balance-correcting weight is to be applied into known orientation, and means for bringing the magnet into closely spaced relation adjacent the location on the rotary element to which balance correcting weight is to be applied.

Further according to this aspect of the invention, the means for orienting the weight for application by placing a magnet on the weight in close proximity to the ferromagnetic portion comprises means for providing an electromagnet including an electromagnetic coil and a ferromagnetic portion, means for orienting the electromagnet with the ferromagnetic portion of the electromagnet adjacent the weight to be applied, and means for passing an electrical current through the electromagnetic coil to attract the ferromagnetic portion of the weight into close proximity to the ferromagnetic portion of the electromagnet.

According to this aspect of the invention, means are provided for interrupting the current through the electromagnetic coil.

The invention may best be understood by referring to the following description and accompanying drawing which illustrate the invention. In the drawings:

FIG. 1a illustrates an entry-side elevational view of a station to which wheel-and-tire assemblies requiring the addition of balance correcting weights are conveyed, where balance correcting weights are automatically applied to the upwardly facing rim flanges of the wheel-and-tire assemblies, and away from which the wheel-and-tire assemblies are conveyed after the application of balance correcting weights;

Figure 1A:
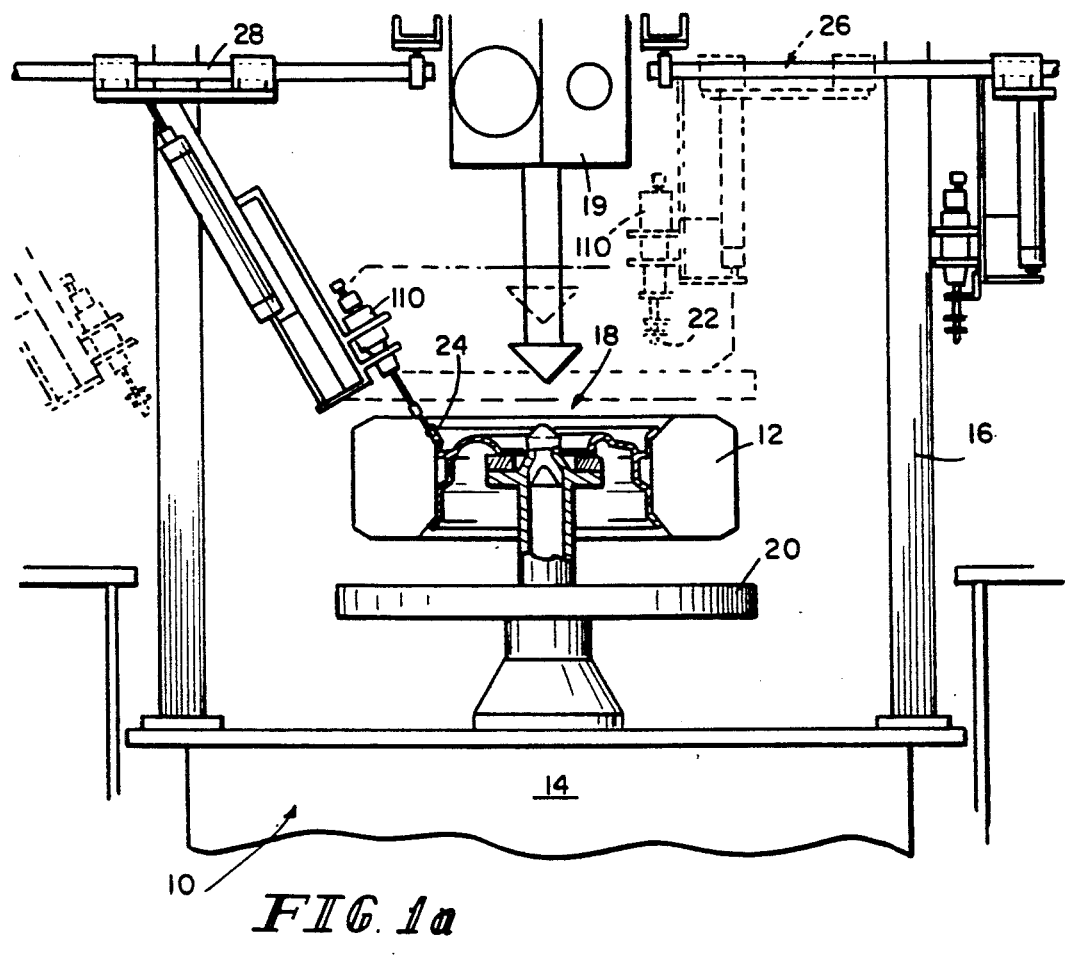
FIG. 1b illustrates an entry-side elevational view of a station to which wheel-and-tire assemblies requiring the addition of balance correcting weights are conveyed, where balance correcting weights are automatically applied to the downwardly facing rim flanges of the wheel-and-tire assemblies, and away from the application of the balance correcting weights.

Turning to FIG. 1a, an automatic weight application station 10 for applying balance correcting weights to wheel-and-tire assemblies 12 is viewed from its entry end 14. Station 10 includes a framework 16 for supporting the station's operating mechanisms which include a chuck 18 and a conveyor/elevator mechanism 20, both of known construction, and two automatic weight application hammers 22, 24. Hammer 22 is mounted above and to one side of chuck 18. Hammer 24 is mounted above and to the other side of chuck 18. Hammers 22, 24 are mounted on carriages 26, 28, respectively, for movement between non-use orientations, illustrated by the solid-line position of hammer 22 and the broken-line position of hammer 24, and use orientations, illustrated by the broken-line position of hammer 22 and the solid-line position of hammer 24. Carriages 26, 28 include means such as, for example, rodless pneumatic cylinders, to reciprocate hammers 22, 24 between their use and non-use orientations under the control of, for example, a programmable controller.

The non-use orientations of hammers 22, 24 permit wheel-and-tire assemblies 12 requiring balance correction to be conveyed on a conveyor section 20 into the station 10. Conveyor section 20 is then lowered, depositing the wheel-and-tire assemblies requiring correction onto chuck 18. Since the amount(s) and location(s) of correctable imbalance(s) in the wheel-and-tire assemblies 12 have already been determined and the orientations of the wheel-and-tire assemblies are known, the chuck mechanism 18 can be driven rotatably to orient the location(s) of imbalance of the wheel-and-tire assemblies beneath the use (broken-line) orientation of hammer 22 or below the use (solid-line) orientation of hammer 24, depending upon whether the wheel of the particular wheel-and-tire assembly, the imbalance of which is being corrected, is steel or aluminum. If the wheel is steel, hammer 22 is used. If the wheel is aluminum, hammer 24 is used. Once the balance correcting weight has been applied, carriages 26, 28 return to their non-use orientations, chuck mechanism 18 releases the wheel-and-tire assembly, the conveyor/elevator section 20 elevates the wheel and tire assembly off the chuck mechanism 18, raising the assembly 12 back to the broken line orientation illustrated in FIG. 1a, and the wheel-and-tire assembly is conveyed out of station 10 for further processing via an overhead transfer mechanism 19.

Figure 1B:
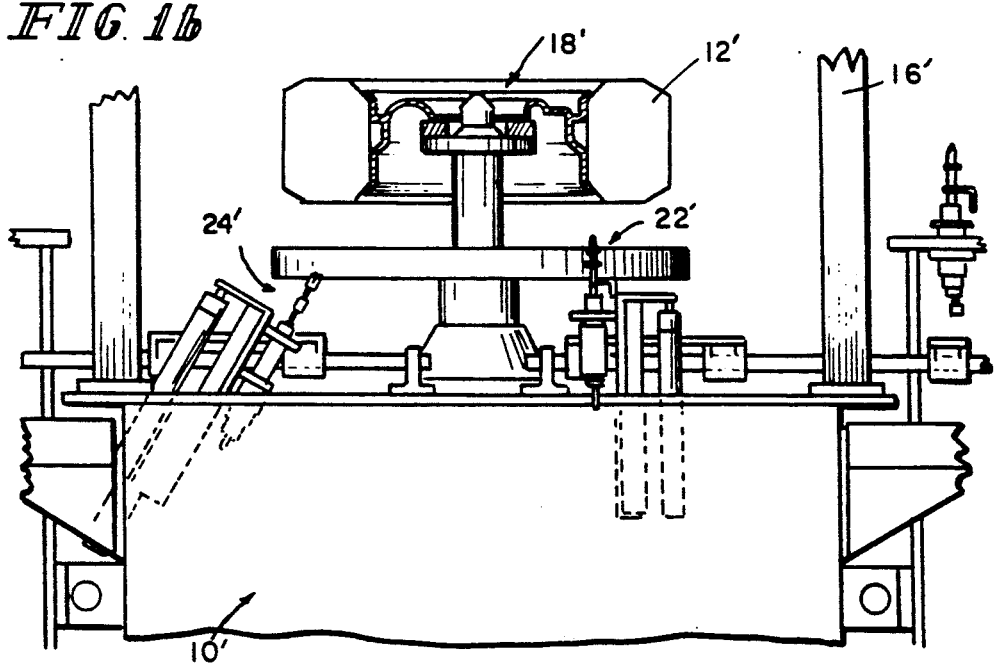
Figure 2:
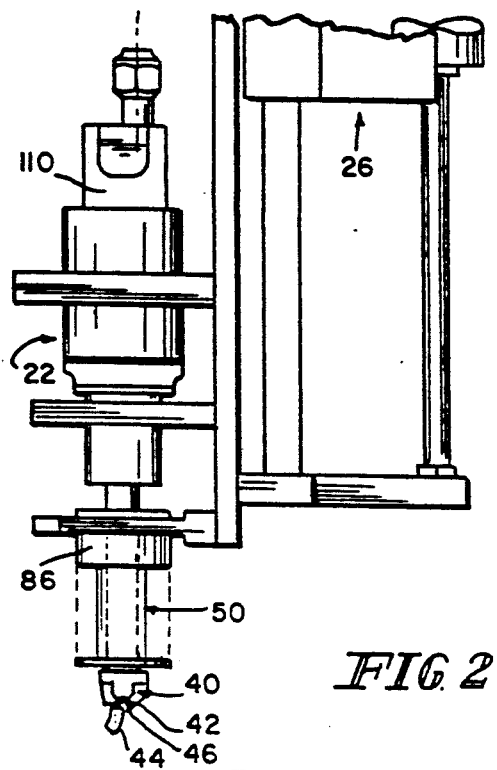
FIG. 2 illustrates a fragmentary side elevational view of certain details of the station illustrated in FIGS. 1a–b.
Figure 3:
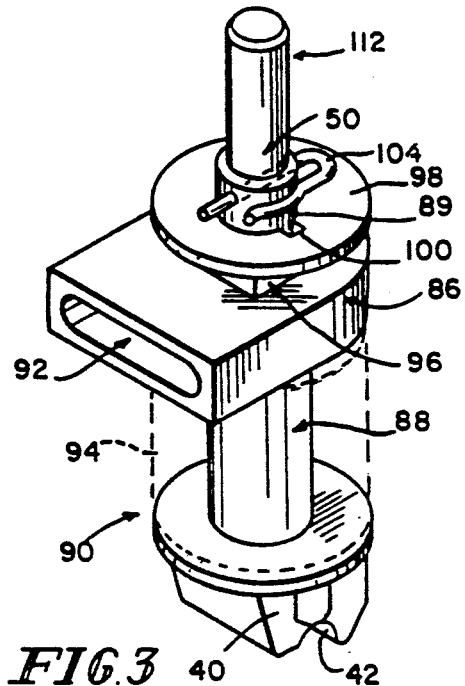
FIG. 3 illustrates a perspective view of certain of the details illustrated in FIG. 2.
Figure 4:
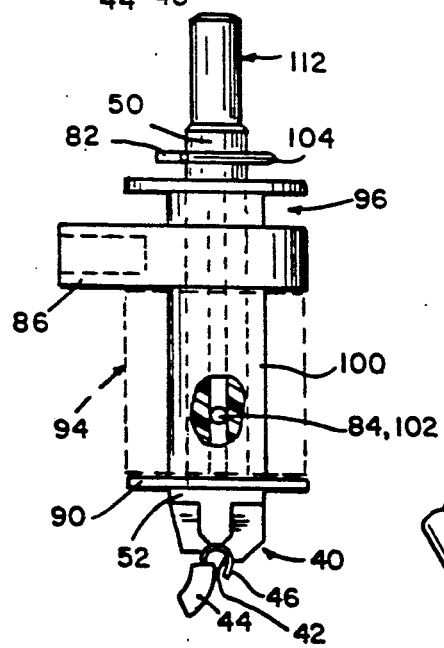
FIG. 4 illustrates a fragmentary side elevational view of certain details of the stations illustrated in FIGS. 1a–b.
Figure 5:
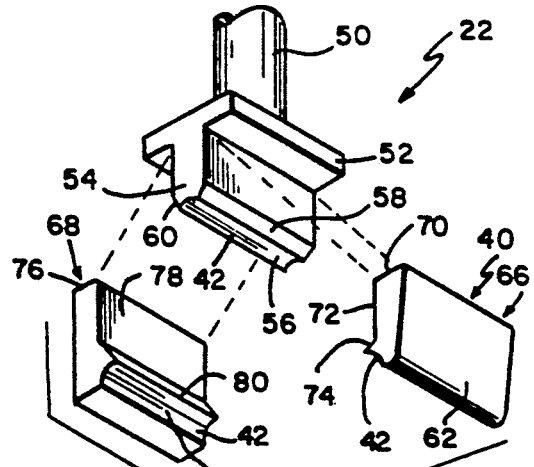
FIG. 5 illustrates an exploded perspective view of the details illustrated in FIG. 4.

It is to be understood that the balance correction system here described is a two plane system, and that a companion station 10' illustrated in FIG. 1b is located immediately upstream or downstream from station 10. This companion station has a hammer 24' in the oblique orientation of hammer 24 but below a chuck 18', for application of balance correction weights to the lower flanges of horizontally oriented aluminum wheels. By the same token, this companion station 10' has a hammer 22' in the vertical orientation of hammer 22 but below chuck 18', for application of balance correcting weights to the lower flanges of horizontally oriented steel wheels. The vertically oriented hammers 22, 22' are used in the application of balance correcting weights to steel wheels. The obliquely oriented hammers 24, 24' are used in the application of balance correcting weights to aluminum wheels.

Closer consideration of the construction of hammers 22, 22' is permitted with reference to FIGS. 2–5. Hammer 22 is illustrative. It includes a jaw portion 40 having a contour 42 conforming, at least in part, to the transverse sectional shape of a portion of a combination balance correcting weight 44 and clip 46 for correcting imbalance in a steel wheel. Clip 46 is constructed from a ferromagnetic material, such as spring steel. Weight 44 typically is lead or a lead alloy molded onto clip 46. Hammer 22 also includes a shank portion 50 joined to jaw portion 40 at a somewhat rectangular pad 52 integrally formed with shank 50, FIGS. 4–5. A center section 54 of jaw portion 40 is also integrally formed with shank 50. Center section 54 extends generally transversely to the longitudinal extent of shank 50 and also transversely to the radii of wheel and tire assemblies onto which hammer 22 hammers balance correcting weights. The surface 56 of center section 54 remote from pad 52 provides a portion of the contour 42. Bevelled surfaces 58, 60 of center section 54 are provided adjacent surface 56. Shank portion 50, pad 52 and center section 54 are machined from a ferromagnetic material such as mild steel.

Side surfaces 62, 64 (FIG. 5) of jaw 40 are provided by inserts 66, 68, respectively Side surfaces 62, 64 provide part of the contour 42. Inserts 66, 68 are also provided with surfaces 70, 72, 74 and 76, 78, 80 which abut pad 52 and center section 54. Inserts 66, 68 are constructed from non-magnetic material. Illustratively, inserts 66, 68 are constructed from stainless steel and are attached to pad 52 and center section 54 by brazing.

Shank 50 is provided near its upper end with a through passageway 82. Another opening 84 is provided in shank 50 between passageway 82 and pad 52.

Hammer 22 also includes a bobbin 86 which illustratively is molded from nylon. Bobbin 86 includes a column 88 providing a central passageway 89 which slidably receives shank 50, an endplate 90, a socket 92 for receiving an electrical connector (not shown) by which electrical contact can be made from a current source (not shown) in station 10 to a coil 94 (illustrated in broken lines) of several turns of insulated wire wound on bobbin 86, a square cross-section portion 96, and an endplate 98. Square cross-section portion 96 is received in a square slot on carriage 26 to prevent bobbin 86 from turning relative to carriage 26. Central passageway 89 includes a longitudinally extending, generally rectangular cross-section slideway 100 (FIG. 3) which receives a locator pin 102 with which opening 84 is fitted. The engagement of locator pin 102 in slideway 100 prevents rotation of shank 50 in passageway 89. Endplate 90 cooperates with pad 52 to retain shank 50 in bobbin 86 in one direction. A key 104 insertable through passageway 82 cooperates with endplate 98 to retain shank 50 in bobbin 86 in the other direction.

An air hammer 110 (FIG. 1) is associated with carriage 26. Air hammer 110 receives the end 112 (FIGS. 4–5) of shank 50 remote from jaw 40. Actuation of air hammer 110 drives the hammer 22 through cycles of operation to drive a weight 44 and clip 46 assembly onto the flange of a steel wheel rim. Air hammer 110 illustratively is an Ingersoll-Rand Model AVC13-Cl suitably valved to operate hammer 22 under the control of a process controller.

Figure 6:
FIG. 6 illustrates a fragmentary side elevational view of certain details of the stations illustrated in FIGS. 1a–b.

Referring to FIG. 6, hammers 24, 24' are similarly configured to hammers 22, 22' except that the contour 142 of hammers 24, 24' conforms, at least in part, to the transverse sectional shape of a portion of a combination balance correcting weight 144 and clip 146 for correcting imbalance in an aluminum wheel.

In operation, a means (not shown) for delivering a balance correcting weight in the proper orientation to be engaged by hammer 22 or 24 conveys the appropriate weight to the hammer while the hammer is in its non-use orientation. Such a delivery means can comprise multiple vibratory feeders with a programmable controller operated gate for selecting which feeder is to supply balance correcting weight to correct imbalance in a particular wheel and tire assembly 12. For example, if five different weights, illustratively, 0.5 oz., 1.0 oz., 1.5 oz., 2.0 oz. and 2.5 oz. (14 g., 28 g , 42 5 g. . . , 56.7 g. and 70.9 g., respectively) are available to correct imbalance in vehicle wheel and tire assemblies passing along conveyor 20, five vibratory feeders feed weights for correcting imbalances in steel wheels to the non-use position of hammer 22. Five vibratory feeders feed weights for correcting imbalances in aluminum wheels to the non-use position of hammer 24. The feeders feed weights in the Proper orientations to their respective jaws 40, 140.

As the appropriate weight to correct an imbalance in a plane of a particular steel or aluminum wheel and tire assembly 12 is presented at the appropriate jaw 40, 140, the coil 94 associated with that jaw 40, 140 is energized to capture the appropriate weight 44, 144 and clip 46, 146 assembly in the jaw 40, 140. Concurrently, the conveyor section is lowered to lower the wheel and tire assembly 12, the imbalance of which is to be corrected, onto the chuck 18. The chuck 18 orients the unbalanced wheel-and-tire assembly with the location at which weight is to be applied under the use position of hammer 22 (for steel wheels) or hammer 24 (for aluminum wheels). The hammer 22 or 24 is then advanced until the weight-and-clip assembly comes to rest in contact with the wheel flange at the location at which the correcting weight-and-clip assembly is to be applied. The pneumatic hammer 110 associated with the appropriate hammer 22, 24 is then driven to execute a number of operating cycles to hammer the appropriate weight onto the wheel-and-tire assembly at the appropriate location. The coil 94 is then deenergized to release the weight-and-clip assembly. The carriage 26, 28 is then retracted to its non-use orientation. The conveyor is elevated, and the wheel-and-tire assembly, with balance-correcting weight attached, proceeds to further processing.

I claim:

1. Apparatus for automatically applying a balance correcting weight (44) -and-clip (46) assembly to a vehicle wheel-and-tire assembly (12), the weight (44) -and-clip (46) assembly including a ferromagnetic clip (46) for mounting the weight (44) on a flange of the vehicle wheel-and-tire assembly (12), the apparatus comprising means (40) for orienting the weight (44)-and-clip (46) assembly for application by placing a magnet (54, 94) on the weight (44)-and-clip (46) assembly in close proximity to the clip (46), means (26, 28) for conveying the magnet (54, 94) into close proximity to the vehicle wheel-and-tire assembly (12), means (20) for relatively orienting the vehicle wheel-and-tire assembly (12) and magnet (54, 94) so that the weight (44)-and-clip (46) assembly carried by the magnet (54, 94) is properly oriented (42) to be applied to the vehicle wheel-and-tire assembly (12) to correct imbalance existing in the vehicle wheel-and-tire assembly (12), and means (110) for exerting force on the magnet (54, 94) to move the magnet relative to the flange of the vehicle wheel-and-tire assembly (12) to which the weight (44)-and-clip (46) assembly is to be applied to hammer the clip (46) onto the flange.

2. The apparatus of claim 1 wherein the means for relatively orienting the vehicle wheel-and-tire assembly (12) and magnet (54, 94) so that the weight (44)-and-clip (46) assembly carried by the magnet (54, 94) is properly oriented to be applied to the flange of the vehicle wheel-and-tire assembly (12) to correct imbalance existing in the flange of the vehicle wheel-and-tire assembly (12) comprises means (20) for rotating the location on the flange of the vehicle wheel-and-tire assembly (12) to which balance correcting weight (44) is to be applied into known orientation.

3. The apparatus of claim 2 wherein the magnet (54) comprises an electromagnet (54, 94) including an electromagnetic coil (94) and a ferromagnetic portion (54), the means (40) for orienting the weight-and-clip assembly for application orienting the electromagnet (54, 94) with the ferromagnetic portion (54) of the electromagnetic (54, 94) adjacent the weight (44)-and-clip (46) assembly to be applied, and means for passing an electrical current through the electromagnetic coil (94) to attract the ferromagnetic clip (46) of the weight (44)-and-clip (46) assembly into close proximity to the ferromagnetic portion (54) of the electromagnet (54, 94).

4. The apparatus of claim 3 and further comprising means for interrupting the current through the electromagnetic coil (94).

5. A method for automatically applying a balance correcting weight (44)-and-clip (46) assembly to a vehicle wheel-and-tire assembly (12), the weight (44)-and-clip (46) assembly including a ferromagnetic clip (46) for mounting the weight (44) on a flange of the vehicle wheel-and-tire assembly (12), the method comprising orienting the weight (44)-and-clip (46) assembly for application by placing a magnet (54, 94) on the weight (44)-and-clip (46) assembly in close proximity to the clip (46), conveying the magnet (54, 94) into close proximity to the vehicle wheel-and-tire assembly (12), relatively orienting the vehicle wheel-and-tire assembly (12) and magnet (54, 94) so that the weight (44)-and-clip (46) assembly carried by the magnet (54, 94) is properly oriented to be applied to the vehicle wheel-and-tire assembly (12) to correct imbalance existing in the vehicle wheel-and-tire assembly (12), and exerting force (11) on the magnet (54, 94) to move the magnet relative to the the flange of the vehicle wheel-and-tire assembly (12) to which the weight (44)-and-clip (46) assembly is to be applied to hammer the clip (46) onto the flange.

6. The method of claim 5 wherein relatively orienting the vehicle wheel-and-tire assembly (12) and magnet (54, 94) so that the weight (44)-and-clip (46) assembly carried by the magnet (54, 94) is properly oriented to be applied to the flange of the vehicle wheel-and-tire assembly (12) to correct imbalance existing in the flange of the vehicle wheel-and-tire assembly (12) comprises rotating the location on the flange of the vehicle wheel-and-tire assembly (12) to which balance correcting weight (44) is to be applied into known orientation.

7. The method of claim 6 wherein placing a magnet (54, 94) on the weight (44)-and-clip (46) assembly in close proximity to the clip (46) comprises placing an electromagnetic (54, 94) including an electromagnetic coil (94) and a ferromagnetic portion (54) on the weight (44)-and-clip (46) assembly in proximity to the clip (46), orienting the electromagnet (54, 94) with the ferromagnetic portion (54) of the electromagnet (54, 94) adjacent the weight (44)-and-clip (46) assembly to be applied, and passing an electrical current through the electromagnetic coil (94) to attract the ferromagnetic clip (46) of the weight (44)-and-clip (46) assembly into close proximity to the ferromagnetic portion (54) of the electromagnet (54, 94).

8. The method of claim 7 and further comprising interrupting the current through the electromagnetic coil (94).

* * * * *